P. CHAMBERLAIN.
CANNING MACHINE.
APPLICATION FILED APR. 2, 1919.

1,384,599.

Patented July 12, 1921.

2 SHEETS—SHEET 1.

P. Chamberlain
Inventor

By Geo. P. Kimmel
Attorney

P. CHAMBERLAIN.
CANNING MACHINE.
APPLICATION FILED APR. 2, 1919.
1,384,599.
Patented July 12, 1921.
2 SHEETS—SHEET 2.
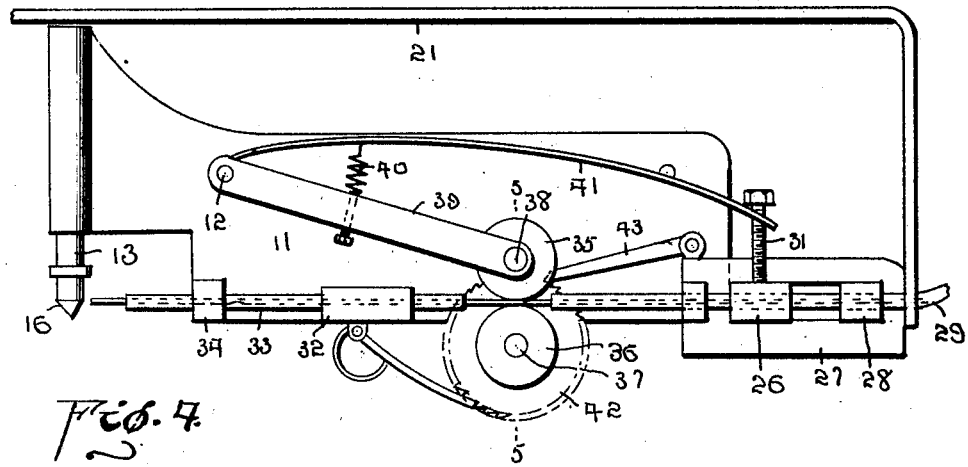
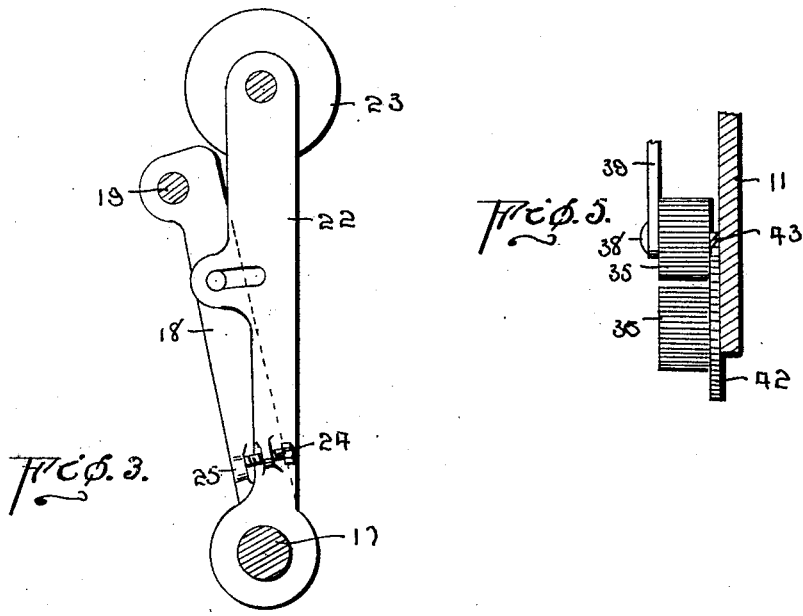
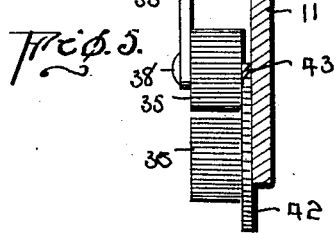
P. Chamberlain
Inventor
By Geo. P. Kimmel
Attorney

UNITED STATES PATENT OFFICE.

PERRY CHAMBERLAIN, OF TROY, PENNSYLVANIA.

CANNING-MACHINE.

1,384,599.

Specification of Letters Patent. Patented July 12, 1921.

Application filed April 2, 1919. Serial No. 286,932.

*To all whom it may concern:*

Be it known that I, PERRY CHAMBERLAIN, a citizen of the United States, residing at Troy, in the county of Bradford and State of Pennsylvania, have invented certain new and useful Improvements in Canning-Machines, of which the following is a specification.

This invention relates to improvements in canning machines and has for its object to provide an improved solder feeding and applying mechanism forming part of the machine by which the vents in the cans are hermetically sealed.

Another object is the provision of a feeding and applying mechanism in which the strip of solder is positively projected against the heated iron by contact of the can with an actuating arm which is disposed in the path of the can as it approaches a position beneath the iron.

Another object is the provision of a machine of this character in which the movement of the feeding mechanism may be varied to desired extent in order that the proper quantity of solder is melted and deposited upon the can at each operation.

With these and other objects in view as will appear as the description proceeds the invention comprises the novel features of construction, accompanied by elements and arrangement of parts which will be more fully described in the following specification as set forth with particularity in the claims appended hereto.

Figure 1:
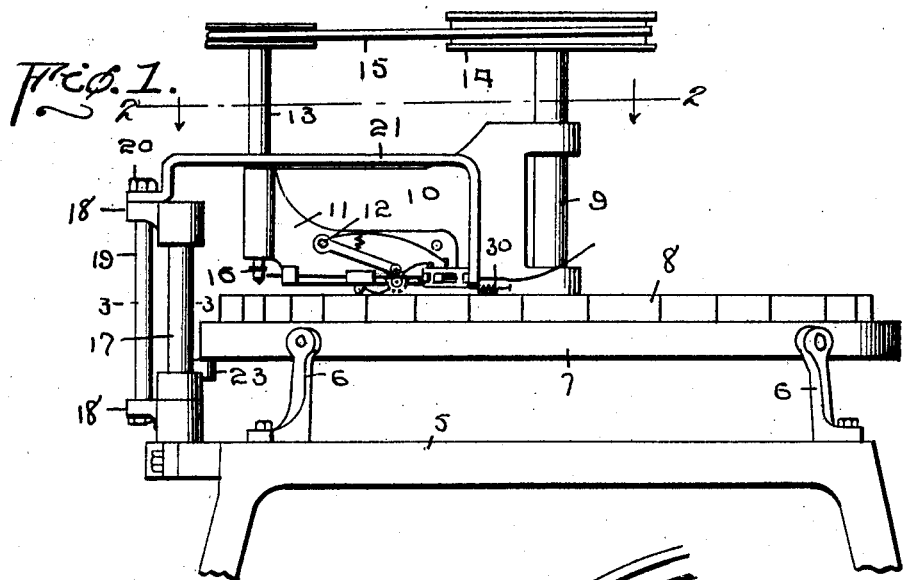
Figure 2:
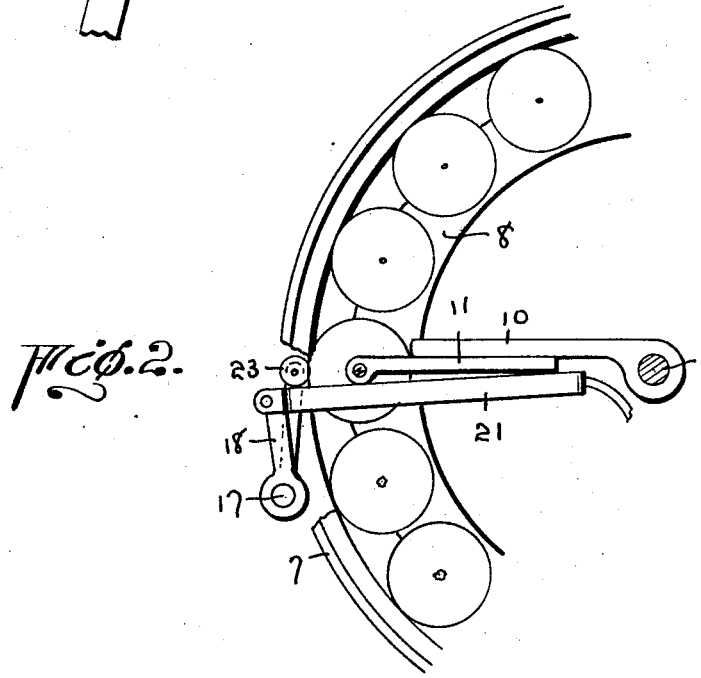

Figure 1 represents a side elevation of a fragment of a canning machine illustrating the invention applied thereto, Fig. 2 represents a fragmental horizontal sectional view on the line 2—2 of Fig. 1, Fig. 3 represents a detailed sectional view on the line 3—3 of Fig. 1, Fig. 4 represents an enlarged front elevation of the solder feeding mechanism removed from the machine, and Fig. 5 represents a vertical sectional view on the line 5—5 of Fig. 4.

Referring to the drawing in detail wherein similar reference characters designate corresponding parts throughout the several views, the numeral 5 indicates the supporting bed or table of a canning machine provided with supporting arms 6 carried by a circular ring 7 forming a guide for the cans traveling with the recessed and rotary carrier 8 which may be operated in any approved manner in order to successively move the cans beneath the soldering mechanism. A shaft 9 is adequately supported above the carrier 8 and its axis is coincident with the axis of the carrier. A supporting plate 10 is supported at one terminal upon the shaft 9 and at its opposite terminal on a part of the bed plate 5 and the base of the soldering mechanism 11 is bolted or otherwise secured as indicated at 12 to the front of the plate 10. A shaft 13 is journaled in the outer terminal of the base 11 and is connected with a pulley 14 at the other terminal of the shaft 9 by a belt 15 whereby rotary movement of the shaft 9 is transmitted to the shaft 13 and to the rotary soldering iron 16.

A vertical shaft 17 is supported laterally of the ring or guide 7 and pivotally supports a pair of arms 18 connected by a vertically extending rod 19 having a nut 20 fitted upon its upper terminal whereby the angular extremity of the actuating rod 21 is connected therewith. A trip arm 22 is pivotally supported upon the shaft 17 above and in contact with the lower arm 18 and supports a can engaged roller 23 which is normally disposed in the path of the cans passing beneath the rotary soldering iron 16 and is moved outwardly thereby to effect an automatic operation of the soldering mechanism. It will be understood that the arms 18 and 22 are independently movable while the movement of the arm 22 is transmitted to the arms 18 by a set screw 24 engageable by a lug 25 carried by the arm 18 whereby the extent of the movement transmitted from one arm to the other may be varied in order to govern the extent of the operation of the soldering mechanism.

The inner terminal of the supporting plate 11, or that terminal adjacent the shaft 9 is provided with a laterally projecting lug 26 constituting a support or a sliding plate 27 having a longitudinal slot therein receiving the lug and provided with lateral apertured lugs 28 receiving the guide feed 29 for the solder wire. The plate 27 is automatically retracted subsequent to an operation thereof by a contractile spring 30 and the tube 29 is held stationary with relation to the base plate 11 by a set screw 31 fitted in the lug 26 and engaging the tube. At a point outwardly of the plate 27 a guide lug 32 is formed upon the plate 11 and receives, at its rear terminal, the wire solder and connects with a supplementary guide tube 33 which extends a distance outwardly at the plate and is supported at its outer terminal in a lug 34. The terminal of the supplementary tube 33 is so disposed, as to guide the wire solder upon the lower heated end of the iron 16 by which the solder is melted and permitted to drop by gravity over the vent in the can reposed thereunder. Intermediate the guide lugs 26 and 32, a pair of pinions or spur wheels 35 and 36 are rotatably mounted laterally at the plate 11 and engage the exposed portion of the wire solder lying intermediate the sections 29 and 33 of the guide tube. The lower spur wheel 36 is mounted upon a relatively stationary shaft 37 whereas the upper wheel is supported upon a movable shaft 38 supported upon an arm 39 pivotally attached to one of the supporting bolts 12 of the base plate 11 and engaged by a spring 40 the tension of which normally retains the wheel or roller 35 in contact with the roller 36. The abutment for the upper terminal of the spring 40 is formed by a strip 41 extending between and secured to the bolts 12 and 31.

A relatively large ratchet wheel 42 is secured laterally of the lower feed roller 36 and is positively and intermittently actuated with the reciprocation of the plate 27 by a pawl 43 pivoted to the outer terminal of the slide plate 27 and movable over the teeth of the ratchet wheel. In this manner the spurred feed roller 36 is positively and intermittently actuated during reciprocation of the plate 27 and the wire solder is firmly held in contact with the positively actuated roller by the spring actuated roller 35 thus providing a positive feed for drawing the wire solder through the guide wheels and forcibly projecting it against the iron 26.

In the practical operation of the machine, the rotary carrier 8 is operated in an approved manner and operates to successively move a series of cans beneath the soldering iron 16, and, as will be understood, the iron is continuously rotated during operation of the machine through its connection 15 with the shaft 9. As each can moves to a position beneath the iron 16 it engages the obstructing roller 23, effecting an outward movement of the arm 22 upon the shaft 17 and, incident to the contact of the screw 24 with the lug 25 the arms 18, bolt 19 and rod 21 are shifted outwardly. The inner terminal of the rod engages and actuates the slide plate 27 and such movement is transmitted to the ratchet wheel 42 through the pawl 43 effecting a comparatively limited rotary movement of the ratchet wheel together with the feed roller 36 and due to the pressure exerted by the spring actuated roller 35 upon the wire solder and its firm contact with the roughened surface of the positively actuated roller 36, the solder is drawn through the guide wheels and forcibly projected against the iron 16 which melts a predetermined quantity of the solder, according to the adjustment of the screw 24 and the consequent movement of the slide plate 27 and the melted solder falls by gravity over the vent in the can finally solidifying and hermetically sealing the can. As the soldered can moves from beneath the iron 16, the slide plate 27 is automatically retracted by the spring 30 and the operation as herein described is repeated each time the roller 23 is engaged and actuated by the contact of a can therewith.

What I claim is:

1. In a canning machine, a can carrier, and a soldering mechanism, said mechanism including a heated soldering iron, means for intermittently feeding a soldering strip against the iron, an actuating member carried by the feeding means, a pivoted arm operable by contact with the cans traveling with the carrier, and an adjustable abutment carried by the arm and engageable with the actuating member for variably actuating the feeding means.

2. In a canning machine, a rotary can carrier, a vertically disposed rotary shaft mounted concentrically thereof, a supporting plate mounted on said shaft and extending radially therefrom, a solder feeding mechanism mounted upon said plate, a rotary soldering iron rotatably supported in the outer extremity of said plate, a flexible driving member for transmitting rotary movement of said shaft to said soldering iron, and means supported independently of the plate to actuate the solder feeding mechanism.

3. In a canning machine, a rotary can carrier, a vertically disposed shaft mounted concentrically thereof, a supporting plate mounted on the shaft, a rotatable soldering iron mounted in the terminal of said plate, a solder feeding mechanism mounted upon said plate for feeding solder against the terminal of the iron, an arm pivotally mounted laterally of the can carrier and adjacent the iron and operable by cans moving with the carrier, a second pivoted arm, an adjustable abutment carried by the first arm engageable with the second arm for actuating the latter, and means connecting the second mentioned arm with the solder feeding mechanism for actuating the latter.

4. In a canning machine, a soldering mechanism comprising a body plate, a guide lug carried thereby, a slide plate mounted upon the lug, solder receiving means carried by the plate, a solder feeding wheel journaled on the body plate, means carried by the slide plate for actuating the wheel, means for maintaining the solder in engagement with the feed wheel, a soldering iron, and means for guiding the solder against said iron.

5. In a canning machine, a soldering mechanism comprising a body plate, a guide lug carried by the body plate, a slide plate mounted upon the lug, a solder strip feeding wheel, means connecting said wheel with said plate for actuating the wheel, a spring actuated presser roller arranged to maintain a strip of solder in contact with the feed wheel, means for varying the tension of the spring actuated roller, guide means for the solder strip arranged on the side of the feed wheel opposite the slide plate, a soldering iron carried by the terminal of the body plate opposite the slide plate.

In testimony whereof, I affix my signature hereto.

PERRY CHAMBERLAIN.